United States Patent
Lai et al.

(10) Patent No.: US 10,239,676 B2
(45) Date of Patent: Mar. 26, 2019

(54) FLEXIBLE FILM COMPOSITION FOR HEAT SEALS AND CONTAINER WITH SAME

(71) Applicant: Dow Global Technologies LLC, Misland, MI (US)

(72) Inventors: Chuan Yar Lai, Freeport, TX (US); Kurt Brunner, Zurich (CH); Jozef J.i. Van Dun, Horgen (CH); Nicolas C. Mazzola, Jundiai (BR); Maria Isabel Arroyo Villan, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 303 days.

(21) Appl. No.: 15/027,879

(22) PCT Filed: Oct. 10, 2014

(86) PCT No.: PCT/US2014/059996
§ 371 (c)(1),
(2) Date: Apr. 7, 2016

(87) PCT Pub. No.: WO2015/057501
PCT Pub. Date: Apr. 23, 2015

(65) Prior Publication Data
US 2016/0244229 A1      Aug. 25, 2016

(30) Foreign Application Priority Data
Oct. 16, 2013   (EP) ..................................... 13382409

(51) Int. Cl.
*B65D 65/02*       (2006.01)
*B32B 7/12*        (2006.01)
(Continued)

(52) U.S. Cl.
CPC ................ *B65D 65/02* (2013.01); *B32B 7/02* (2013.01); *B32B 7/12* (2013.01); *B32B 27/065* (2013.01);
(Continued)

(58) Field of Classification Search
CPC ......... B65D 65/02; B32B 27/325; B32B 7/02; B32B 27/327; B32B 27/304; B32B 27/36;
(Continued)

(56) References Cited

U.S. PATENT DOCUMENTS 5,504,172 A    4/1996  Imuta et al.
6,342,123 B1   1/2002  Rees et al.
(Continued)

FOREIGN PATENT DOCUMENTS

EP    0577321 A1    1/1994
EP    2204409 A1    7/2010
(Continued)

OTHER PUBLICATIONS

Williams et al., Polym. Sci., Polymer Letters, vol. 6, pp. 621-624 (1968).
(Continued)

*Primary Examiner* — James C Yager

(57) ABSTRACT

The present disclosure is directed to compositions and film structures suitable for heat seal production. The heat sealable flexible film structure includes: a layer (A) comprising a blend comprising from 35 to 80 percent by weight of the layer (A) of a propylene based plastomer or elastomer ("PBPE") and from 20 to 65 percent by weight of the layer (A) of a low density polyethylene having a density in the range of from 0.915 g/cm³ to 0.935 g/cm³, wherein the blend has a melt index (as determined according to ASTM D 1238 (at 190° C./2.16 Kg); a layer (B), adjacent to layer (A), comprising a polyolefin-based polymer, wherein the poly-
(Continued)

mer or polymer blend which makes up layer (B) flows more easily than the blend of layer (A) under conditions intended for making a hard seal with the film structure; and an outermost layer (C) comprising a material having a melting point greater than 140° C.; wherein the ratio of the thickness of layer (B) to the thickness of layer (A) is 3:1 or greater. The heat sealable flexible film structure is used to make a flexible container having one or more heat seals. The heat seal can be a frangible heat seal, a hard heat seal, or a combination of frangible heat seals and hard heat seals depending on the sealing conditions.

18 Claims, 2 Drawing Sheets

(51) Int. Cl.
| B32B 27/06 | (2006.01) |
| B32B 27/08 | (2006.01) |
| B32B 27/30 | (2006.01) |
| B32B 27/32 | (2006.01) |
| B32B 27/34 | (2006.01) |
| B32B 27/36 | (2006.01) |
| B32B 7/02  | (2019.01) |

(52) U.S. Cl.
CPC ............ *B32B 27/08* (2013.01); *B32B 27/304* (2013.01); *B32B 27/306* (2013.01); *B32B 27/32* (2013.01); *B32B 27/325* (2013.01); *B32B 27/327* (2013.01); *B32B 27/34* (2013.01); *B32B 27/36* (2013.01); *B32B 2270/00* (2013.01); *B32B 2274/00* (2013.01); *B32B 2307/31* (2013.01); *B32B 2307/582* (2013.01); *B32B 2307/72* (2013.01); *B32B 2439/46* (2013.01)

(58) Field of Classification Search
CPC ....... B32B 27/08; B32B 27/306; B32B 27/34; B32B 7/12; B32B 27/065; B32B 27/32; B32B 2307/72; B32B 2307/582; B32B 2274/00; B32B 2270/00; B32B 2439/46; B32B 2307/31
See application file for complete search history.

(56) References Cited

U.S. PATENT DOCUMENTS

| 6,484,514 B1 | 11/2002 | Joseph et al. |
| 6,525,157 B2 | 2/2003 | Cozewith et al. |
| 6,547,468 B2 | 4/2003 | Gruenbacher et al. |
| 6,590,034 B2 | 7/2003 | Wanic et al. |
| 6,960,635 B2 | 11/2005 | Stevens et al. |
| 7,055,683 B2 | 6/2006 | Bourque et al. |
| 7,306,095 B1 | 12/2007 | Bourque et al. |
| 7,863,383 B2 | 1/2011 | Gibbons et al. |
| 2002/0168512 A1 | 11/2002 | Eggers et al. |
| 2004/0241477 A1 | 12/2004 | Watanabe |
| 2005/0013905 A1* | 1/2005 | Hughes .............. B65D 75/5805 426/106 |
| 2008/0248162 A1 | 10/2008 | Cook et al. |
| 2008/0255296 A1 | 10/2008 | Gibbons et al. |
| 2008/0276645 A1 | 11/2008 | Murray |
| 2015/0328865 A1 | 11/2015 | Hernandez et al. |

FOREIGN PATENT DOCUMENTS

| EP | 2862712 A1 | 4/2015 |
| JP | 2003103729 A | 4/2003 |
| JP | 2003103727 | 9/2003 |
| JP | 200628988 A | 2/2006 |
| JP | 200630588 A | 2/2006 |
| JP | 200715272 A | 1/2007 |
| JP | 2007152728 A | 6/2007 |
| JP | 201007634 A | 1/2010 |
| WO | 2000/01745 A1 | 1/2000 |
| WO | 2005/060899 A1 | 7/2005 |
| WO | 2007044159 A1 | 4/2007 |
| WO | 2008/070190 A2 | 6/2008 |
| WO | 2009050310 A1 | 4/2009 |
| WO | 2009/117461 A1 | 9/2009 |
| WO | 2011162396 A1 | 12/2011 |
| WO | 2014100386 A1 | 6/2014 |
| WO | 2015/057501 A1 | 4/2015 |

OTHER PUBLICATIONS

International Search Report and Written Opinion of the International Searching Authority for PCT/US2013/072026, dated Mar. 21, 2014, 11 pages.
International Search Report and Written Opinion of the International Searching Authority for PCT/US2014/059996, dated Dec. 1, 2014.
International Preliminary Report on Patentability for PCE/US2014/059996, dated Jan. 13, 2016.
International Preliminary Report on Patentability for PCT/US2013/072026, dated Mar. 11, 2015.
International Preliminary Report on Patentability for PCT/US2013/076488, dated Mar. 11, 2015, 13 pages.
International Search Report and Written Opinion of the International Searching Authority for PCT/US2013/076488, dated Mar. 21, 2014.
European Search Report for EP13382409, dated Jan. 2, 2014.

* cited by examiner

FLEXIBLE FILM COMPOSITION FOR HEAT SEALS AND CONTAINER WITH SAME

FIELD

The present disclosure is directed to heat sealable film structures for the production of a flexible container with frangible seals and hard seals.

BACKGROUND

Heat sealable films for the production of flexible containers with frangible seals are known in the art. Flexible containers with frangible seals find utility as temporary storage vessels for items. The frangible seal can be opened manually (by hand) to release or mix the contents of the flexible container.

There is a recognized need for improved heat sealable films for more versatile uses of flexible containers. In particular there is a need for heat sealable films capable of producing both frangible seals and hard seals and simplified production processes for the same.

SUMMARY

The present disclosure is directed to compositions and films for producing heat seals. The compositions and films disclosed herein are advantageously used to produce structures with frangible heat seals, hard heat seals, or a combination of frangible heat seals and hard heat seals depending on the sealing conditions. The present disclosure is further directed to flexible containers containing frangible heat seals, and/or hard heat seals.

The present disclosure provides a flexible film structure that is heat sealable. In an embodiment, the heat sealable flexible film structure includes:

a layer (A) comprising a blend comprising from 35 to 80 percent by weight of the layer (A) of a propylene based plastomer or elastomer ("PBPE") and from 20 to 65 percent by weight of the layer (A) of a low density polyethylene having a density in the range of from 0.915 g/cm$^3$ to 0.935 g/cm$^3$, wherein the blend has a melt index (as determined according to ASTM D-1238 (at 190° C./2.16 Kg)

a layer (B), adjacent to layer (A), comprising a polyolefin-based polymer, wherein the polymer or polymer blend which makes up layer (B) has a melt index (as determined according to ASTM D-1238 (at 190° C./2.16 Kg) which is equal to or higher than the melt index of the blend which makes up layer (A); and an outermost layer (C) comprising a material having a melting point greater than 140° C.; wherein the ratio of the thickness of layer (B) to the thickness of layer (A) is 3:1 or greater.

The heat sealable flexible film structure is capable of forming a heat seal. A hard or lock up) seal is formed when two (A) layers are brought into contact with each other and exposed to a first set of sealing conditions and (ii) a frangible seal is formed when two (A) layers are brought into contact with each other and exposed to a second set of sealing conditions. In general, it is believed that hard seals are produced under conditions, such as higher temperatures or pressures, which allow the adjacent layer (layer (B)) to be squeezed out faster than the seal layer (layer (A)). Without intending to be bound by theory, it is believed that when the adjacent layer is squeezed out, the edges of the seal become blunted, which does not allow failure to be initiated in layer (A) which is comprised of the easy peel material.

The present disclosure also provides a flexible container. In an embodiment, the flexible container includes a first film and a second film. Each film includes a heat sealable flexible film structure comprising:

a seal layer (A) comprising a blend comprising from 35 to 80 percent by weight of the layer (A) of a propylene based plastomer or elastomer ("PBPE") and from 20 to 65 percent by weight of the layer (A) of a low density polyethylene having a density in the range of from 0.915 g/cm$^3$ to 0.935 g/cm$^3$, wherein the blend has a melt index (as determined according to ASTM D-1238 (at 190° C./2.16 Kg)

a base layer (B), adjacent to layer (A), comprising a polyolefin-based polymer, wherein the polymer or polymer blend which makes up layer (B) has a melt index (as determined according to ASTM D-1238 (at 190° C./2.16 Kg) which is equal to or higher than the melt index of the blend which makes up layer (A); and an outermost layer (C) comprising a material having a melting point greater than 140° C.; wherein the ratio of the thickness of layer (B) to the thickness of layer (A) is 3:1 or greater. While the upper limit of such range is more a matter of practicality rather than functioning of the invention, in general the upper range of the ratio of thickness of layer (B) to layer (A) will be 20:1, 10:1 or even 5:1.

The films are arranged such that the seal layer (A) of each film is in contact with each other. The second film is superimposed on the first film to form a common peripheral edge. The flexible container includes a heat seal located along at least a portion of the common peripheral edge.

DETAILED DESCRIPTION

Figure 1:
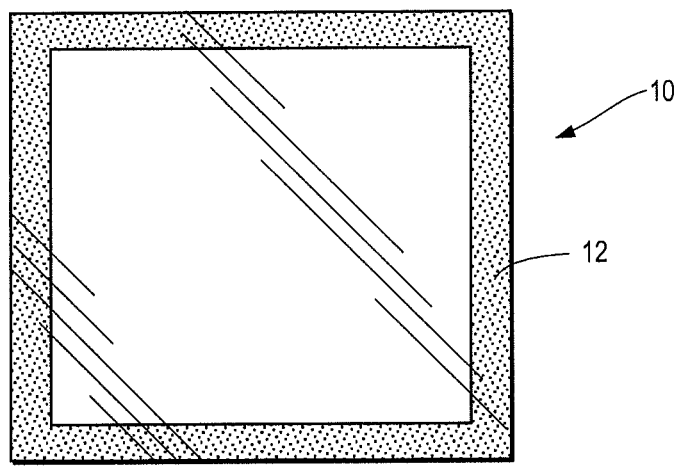
FIG. 1 is an elevation view of a flexible container in accordance with an embodiment of the present disclosure.

The present disclosure provides a heat sealable flexible film structure. In an embodiment, the heat sealable flexible film structure includes a layer (A), a layer (B), an outermost layer (C), and optional one or more additional layers.

A "heat sealable film structure," as used herein, is a film structure that forms a heat seal when subjected to a heat sealing procedure. A heat sealing procedure includes hot metal sealing jaws that are moved from an open position to a closed position. In the closed position, the hot metal jaws come into direct contact with the outermost layers of a film for a period of time (dwell time), a predetermined sealing pressure, and a predetermined sealing temperature. During the dwell time, heat is transferred through the outermost layer of the film to melt and fuse opposing inner seal layers to form a heat seal. Generally, the outermost layer has a higher melting temperature than the seal layer. As such, while the seal layer is melted to form a seal, the outermost layer of the film does not melt and does not stick, or does not substantially stick, to the sealing jaws. Surface treatments to the sealing jaw bars may be applied to further reduce stickiness effects to the films. After the sealing jaws reopen, the film is cooled to room temperature. The heat sealing procedure can be used to form the film into a desired shape—such as a bag, a pouch, a sachet, and a stand up pouch, for example.

In an embodiment, the hot metal jaws are a component of a form, fill, and seal device. The heat seal can be a frangible seal or a hard seal. A "frangible seal," as used herein, is a heat seal that is manually separable (or peelable) without destruction of the film. A "hard seal" or "lock up seal", as used herein, is a heat seal that is not manually separable without destruction of the film. In general, a frangible seal is designed to be separable or openable with application of finger pressure or hand pressure to the seal. A hard seal is designed to remain intact with application of finger pressure or hand pressure to the seal.

The present heat sealable flexible film structure includes:

a layer (A) comprising a blend comprising from 35 to 80 percent by weight of the layer (A) of a propylene based plastomer or elastomer ("PBPE") and from 20 to 65 percent by weight of the layer (A) of a low density polyethylene having a density in the range of from 0.915 g/cm$^3$ to 0.935 g/cm$^3$, wherein the blend has a melt index (as determined according to ASTM D-1238 (at 190° C./2.16 Kg)

a layer (B), adjacent to layer (A), comprising a polyolefin-based polymer, wherein the polymer or polymer blend which makes up layer (B) has a melt index (as determined according to ASTM D-1238 (at 190° C./2.16 Kg) which is equal to or higher than the melt index of the blend which makes up layer (A); and an outermost layer (C) comprising a material having a melting point greater than 140° C.; wherein the ratio of the thickness of layer (B) to the thickness of layer (A) is 3:1 or greater.

1. Layer (A)

The layer (A) includes a blend of a propylene based plastomer or elastomer ("PBPE") and a low density polyethylene (LDPE). In an embodiment, the layer (A) is a seal layer (A). A "propylene-based plastomer or elastomer" (or "PBPE") comprises at least one copolymer with at least 50 weight percent of units derived from propylene and at least about 5 weight percent of units derived from a comonomer other than propylene.

The PBPE is characterized as having substantially isotactic propylene sequences. "Substantially isotactic propylene sequences" means the sequences have an isotactic triad (mm) measured by $^{13}$C NMR of greater than 0.85, or greater than 0.90, or greater than 0.92, or greater than 0.93. Isotactic triads are known in the art and described in, for example, U.S. Pat. No. 5,504,172 and WO 2000/01745, which refer to the isotactic sequence in terms of a triad unit in the copolymer molecular chain determined by $^{13}$C NMR spectra.

The PBPE has a melt flow rate (MFR) in the range of from 0.1 to 25 g/10 minutes (min.), measured in accordance with ASTM D-1238 (at 230° C./2.16 Kg). All individual values and subranges from 0.1 to 25 g/10 min. are included and disclosed herein; for example, the MFR can be from a lower limit of 0.1, 0.2, or 0.5, to an upper limit of 25, 15, 10, 8, or 5, g/10 min. For example, when the PBPE is propylene/ethylene copolymer, it may have a MFR in the range of 0.1 to 10, or in the alternative, 0.2 to 10, g/10 min.

The PBPE has a crystallinity in the range of from at least 1 to 30 wt % (a heat of fusion of at least 2 to less than 50 Joules/gram (J/g)), all individual values and subranges thereof being included and disclosed herein. For example, the crystallinity can be from a lower limit of 1, 2.5, or 3, wt % (respectively, at least 2, 4, or 5 J/g) to an upper limit of 30, 24, 15 or 7, wt % (respectively, less than 50, 40, 24.8 or 11 J/g). For example, when the PBPE is propylene/ethylene copolymer, it may have a crystallinity in the range of from at least 1 to 24, 15, 7, or 5, wt % (respectively, at least 2 to less than 40, 24.8, 11, or 8.3 J/g). Crystallinity is measured via DSC method, as described below in the test methods section. The propylene/ethylene copolymer comprises units derived from propylene and polymeric units derived from ethylene comonomer and optional $C_4$-$C_{10}$ α-olefin. Exemplary comonomers are $C_2$, and $C_4$ to $C_{10}$ α-olefins; for example, $C_2$, $C_4$, $C_6$ and $C_8$ α-olefins (ethylene is considered an α-olefin in this disclosure).

In an embodiment, the PBPE comprises from 1 wt % to 40 wt % ethylene comonomer. All individual values and subranges from 1 wt % to 40 wt % are included and disclosed herein; for example, the comonomer content can be from a lower limit of 1, 3, 4, 5, 7 or 9, wt % to an upper limit of 40, 35, 30, 27, 20, 15, 12 or 9, wt %. For example, the propylene/ethylene copolymer comprises from 1 to 35 wt %, or, in alternative, from 1 to 30, 3 to 27, 3 to 20, or from 3 to 15, wt %, of ethylene comonomer.

In an embodiment, the PBPE has a density from 0.850 g/cc, or 0.860 g/cc, or 0.865 g/cc to 0.900 g/cc.

In an embodiment, the PBPE has a molecular weight distribution (MWD), defined as weight average molecular weight divided by number average molecular weight ($M_w$/$M_n$) of 3.5 or less; in the alternative 3.0 or less; or in another alternative from 1.8 to 3.0.

Such PBPE types of polymers are further described in U.S. Pat. No. 6,960,635 and U.S. Pat. No. 6,525,157, incorporated herein by reference. Such PBPE is commercially available from The Dow Chemical Company, under the tradename VERSIFY, or from ExxonMobil Chemical Company, under the tradename VISTAMAXX.

In an embodiment, the PBPE is further characterized as comprising (A) between 60 and less than 100, between 80 and 99, or between 85 and 99, wt % units derived from propylene, and (B) between greater than zero and 40, or between 1 and 20, 4 and 16, or between 4 and 15, wt % units derived from ethylene and optionally one or more $C_{4-10}$ α-olefin; and containing an average of at least 0.001, at least 0.005, or at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene/ethylene copolymer interpolymer does not exceed 3 long chain branches/1000 total carbons.

In an embodiment, the PBPE copolymer has a melt temperature (Tm) from 55° C. to 146° C.

A nonlimiting example of a suitable propylene/ethylene copolymer is VERSIFY 3200, available from The Dow Chemical Company.

The PBPE for use in the present invention may comprise two or more embodiments disclosed herein.

The blend of layer (A) also includes low density polyethylene (LDPE). The LDPE has a melt index (MI) from 0.2 g/10 min, or 0.5 g/10 min to 10 g/10 min, or 20 g/10 min, or 50 g/10 min.

The LDPE has a density from 0.915 g/cc, to 0.925 g/cc, or 0.930 g/cc, 0.935 g/cc, or 0.940 g/cc.

In an embodiment, the LDPE is made in an autoclave high pressure polymerization process, a tubular high pressure polymerization process, or combinations thereof. In a further embodiment, the LDPE excludes linear low density polyethylene and high density polyethylene.

The blend of layer (A) includes from 35 wt % to 80 wt % of the PBPE and from 20 wt % to 65 wt % of the LDPE. Weight percent is based on total weight of the layer (A).

In an embodiment, the layer (A) includes 75 wt % PBPE and 25 wt % LDPE. The 75/25 blend further has a density from 0.89 g/cc to 0.90 g/cc, and a melt index from 3.0 g/10 min to 4.0 g/10. In a further embodiment, the 75/25 blend has a density of 0.895 g/cc and a melt index of 3.8 g/10 min.

In an embodiment, the layer (A) includes 50 wt % PBPE and 50 wt % LDPE. The 50/50 blend further has a density from 0.90 g/cc to 0.91 g/cc, and a melt index from 1.0 g/10 min to 2.0 g/10 min. In a further embodiment, the 50/50 blend has a density of 0.902 g/cc and a melt index of 1.2 g/10 min.

The blend of layer (A) can be further characterized by its melt index (as determined according to ASTM D-1238 (at 190° C./2.16 Kg). While the specific melt index of the blend is not as important as its relationship to the melt index of the material used in the adjacent layer (B), in general it will be in the range of from 0.1 to 5 g/10 minutes, or from 1 to 3 g/10 min When it is applied in blown and cast film processes, the melt index may advantageously by in the range of from 1 to 5 g/10 minutes.

While the specific thickness of layer (A) is not as important as its relationship to the thickness of the seal layer (B), in general, it will be in the range of from 5 to 100 microns, preferably 25 to 75 microns and more preferably 30 to 50 microns.

The present layer (A) may comprise two or more embodiments disclosed herein.

2. Layer (B)

Each film includes a layer (B). The layer (B) may be referred to as a base layer (B) or an adjacent layer (B). The layer (B) includes a polyolefin-based polymer. Preferred polyolefin based polymers include: (i) a Ziegler-Natta catalyzed ethylene copolymer comprising repeating units derived from ethylene and one or more α-olefins having from 3 to 10 carbon atoms; (ii) a metallocene-catalyzed ethylene copolymer comprising repeating units derived from ethylene and one or more α-olefins having from 3 to 10 carbon atoms; (iii) a Ziegler-Natta-catalyzed ethylene homopolymer; (iv) a metallocene-catalyzed ethylene homopolymer; and combinations thereof. In an embodiment, the layer (B) is selected from a high density polyethylene (HDPE), a linear low density polyethylene (LLDPE), low density polyethylene (LDPE), homopolymer polypropylene (hPP), random copolymer polypropylene (RCP), polypropylene impact copolymer (ICP) and combinations thereof. Preferably the resin used in layer (B) is 100% of a single polyolefin based polymer, but blends of different polyolefins are possible. Typical are blends of LLDPE with up to 50% LDPE.

In an embodiment, the layer (B) is a linear low density polyethylene. Linear low density polyethylene ("LLDPE") comprises, in polymerized form, a majority weight percent of units derived from ethylene, based on the total weight of the LLDPE. In an embodiment, the LLDPE is an interpolymer of ethylene and at least one ethylenically unsaturated comonomer. In one embodiment, the comonomer is a $C_3$-$C_{20}$ α-olefin. In another embodiment, the comonomer is a $C_3$-$C_8$ α-olefin. In another embodiment, the $C_3$-$C_8$ α-olefin is selected from propylene, 1-butene, 1-hexene, or 1-octene.

In an embodiment, the LLDPE is selected from the following copolymers: ethylene/propylene copolymer, ethylene/butene copolymer, ethylene/hexene copolymer, and ethylene/octene copolymer. In a further embodiment, the LLDPE is an ethylene/octene copolymer.

In an embodiment, the LLDPE has a density in the range from 0.865 g/cc to 0.940 g/cc, or from 0.90 g/cc to 0.94 g/cc. The LLDPE preferably has a melt index (MI) from 0.1 g/10 min to 10 g/10 min, or 0.5 g/10 min to 5 g/10 min.

LLDPE can be produced with Ziegler-Natta catalysts, or single-site catalysts, such as vanadium catalysts and metallocene catalysts. In an embodiment, the LLDPE is produced with a Ziegler-Natta type catalyst. LLDPE is linear and does not contain long chain branching and is different than low density polyethylene ("LDPE") which is branched or heterogeneously branched polyethylene. LDPE has a relatively large number of long chain branches extending from the main polymer backbone. LDPE can be prepared at high pressure using free radical initiators, and typically has a density from 0.915 g/cc to 0.940 g/cc.

In an embodiment, the LLDPE is a Ziegler-Natta catalyzed ethylene and octene copolymer and has a density from 0.90 g/cc to 0.93 g/cc, or 0.92 g/cc. Nonlimiting examples of suitable Ziegler-Natta catalyzed LLDPE are polymers sold under the tradename DOWLEX, available from The Dow Chemical Company, Midland, Mich.

Nonlimiting examples of suitable LLDPE for layer (B) include DOWLEX 2045B and DOWLEX 2107B available from The Dow Chemical Company.

In an embodiment, the layer (B) is a high density polyethylene (HDPE). The HDPE is an ethylene homopolymer or an ethylene-based interpolymer. The ethylene-based interpolymer comprises, in polymerized form, a majority weight percent ethylene based on the weight of the interpolymer, and one or more comonomers. The HDPE has a density from 0.940 g/cc, or greater than 0.940 g/cc. In an embodiment, the HDPE has a density from 0.940 g/cc to 0.970 g/cc, or from 0.950 g/cc to 0.960 g/cc, or 0.956 g/cc. In one embodiment, the HDPE has a melt index from 0.1 g/10 min to 10 g/10 min or from 0.5 g/10 min to 5 g/10 min. The HDPE can include ethylene and one or more $C_3$-$C_{20}$ α-olefin comonomers. The comonomer(s) can be linear or branched. Nonlimiting examples of suitable comonomers include propylene, 1-butene, 1-pentene, 4-methyl-1-pentene, 1-hexene, and 1-octene. The HDPE can be prepared with either Ziegler-Natta, chromium-based, constrained geometry or metallocene catalysts in slurry reactors, gas phase reactors or solution reactors.

In an embodiment, the HDPE is an ethylene/α-olefin copolymer with a density from about 0.95 g/cc to 0.96 g/cc, a melt index from 1.5 g/10 min to 2.5 g/10 min. In an embodiment, the HDPE is an ethylene/α-olefin copolymer and has a density from 0.940 g/cc to 0.970 g/cc, or 0.956 g/cc, a melt index from 0.1 g/10 min to 10 g/10 min.

In an embodiment, the HDPE has a density from 0.94 g/cc to 0.962 g/cc and a melt index from 0.5 g/10 min to 1.0 g/10 min.

A nonlimiting example of suitable HDPE for base layer (B) includes ELITE 5960G available from The Dow Chemical Company.

Layer B may comprise two or more of the foregoing embodiments as well as additional materials not described above. The polymer or polymer blend which makes up layer B will preferably have a density in the range of from 0.92 to 0.96 g/cm³, more preferably in the range of from 0.93 to 0.96.

The polymer or polymer blend which makes up layer (B) should flow more easily than the polymer blend which makes up layer (A) at the conditions under which the film will be sealed when intending to form a lock-up (or hard) seal. One way to quickly approximate this is to ensure that the polymer or polymer blend which makes up layer (B) has a melt index (as determined according to ASTM D-1238 (at 190° C./2.16 Kg) which is equal to or higher than the melt index of the blend which makes up layer (A). Preferably, the polymer or polymer blend which makes up layer (B) has a melt index which is at least 10% higher, more preferably at least 100% higher than the melt index of the blend used in layer (A)

While the specific melt index of the blend is not as important as its relationship to the melt index of the material used in the seal layer (A), in general, it will be in the range of from 0.1 to 5 g/10 minutes, more preferably from 1 to 3 g/10 minutes, to make it easily fabricated in a blown or cast film extrusion process.

In an embodiment, the layer (B) excludes LDPE.

In a preferred embodiment, the layer (B) is directly adjacent to layer (A). The term "directly adjacent," as used herein, is intimate contact of layer (A) to layer (B) whereby no intervening layers or no intervening structures are located between layer (A) and layer (B).

The thickness of layer (B) should be such that the ratio of the thickness of layer (B) to the thickness of layer (A) is 3:1 or greater, preferably in the range of from 3:1 to 5:1, more preferably in a range of from 4:1 to 4.5:1.

While the specific thickness of layer (B) is not as important as its relationship to the thickness of the seal layer (A), in general, it will be in the range of from 15 to 100 microns, preferably 25 to 75 microns and more preferably 30 to 50 microns.

3. Outermost layer (C)

The heat sealable flexible film structure includes an outermost layer (C). The outermost layer (C) is composed of a polymer or other material having a melt temperature greater than 140° C. In an embodiment the outermost layer (C) has a melt temperature from greater than 150° C. to 270° C.

In an embodiment, the outermost layer (C) is added as a coating, or may be added as a second film using a lamination process with an optional adhesive to create a cohesive single film structure.

In an embodiment, the outermost layer (C) is formed using a coextrusion process where layers A, B and C are co-extruded in a single process. A coextrusion adhesive layer may be advantageously used as an adjacent layer to the outermost layer (C), thus creating a heat sealable flexible film structure with at least 4 layers.

In an embodiment, outermost layer (C) is a coating, such as a spray coating, a dip coating, or a brush coating. Nonlimiting examples of suitable coating for outermost layer (C) include a varnish or a lacquer with high temperature resistance (i.e., greater 140° C. melt temperature).

Nonlimiting examples of suitable material for outermost layer (C) include poly(ethylene terephthalate) (PET), polyamide, propylene homopolymer, and aluminum foil.

In an embodiment, the outermost layer (C) is a PET film.

4. Inner Layer (D)

The heat sealable flexible film structure may include one or more optional inner layers. It is understood that the heat sealable flexible film structure may include one, two, three or more inner layer(s) (D), layers (D) being the same or different. In an embodiment, the heat sealable flexible film structure includes an inner layer (D). Inner layer (D) is disposed between base layer (B) and outermost layer (C) with layer (A) directly adjacent to layer (B). In an embodiment, inner layer (D) includes an ethylene-based polymer selected from a high density polyethylene (HDPE), a linear low density polyethylene (LLDPE), a low density polyethylene (LDPE) and combinations thereof. Inner layer (D) may be any HDPE or LLDPE as disclosed for base layer (B) above.

Layer (B) and inner layer (D) may be the same or different. In an embodiment, layer (B) and inner layer (D) are the same composition. In an alternate embodiment, layer (B) and inner layer (D) are composed of are different compositions.

In an embodiment, the inner layer (D) is a barrier layer. Suitable polymers for barrier layer include HDPE, LLDPE, LDPE, ethylene vinyl alcohol copolymer (EVOH), maleic anhydride-modified polyethylene, polyamide (PA), cyclic olefin copolymer (COC), ethylene vinyl acetate (EVA), propylene homopolymer (PP), and vinylidene chloride polymer, and combinations thereof.

In many commercial applications two heat sealable flexible films are used together such that the second film is superimposed on the first film so that the seal layer (A) of the first film is in contact with the seal layer (A) of the second film. In other applications a single film or a single sheet may be folded such that two surfaces of the same seal layer (A) are in contact with each other.

The heat sealable flexible film structure forms (i) a hard seal when two (A) layers are brought into contact with each other and exposed to a first range of sealing temperature and (ii) a frangible seal when two (A) layers are brought into contact with each other and exposed to a second range of sealing temperature, the second range being lower than the first range. In an embodiment, the difference between an upper end of the second range of sealing temperature and a lower end of the second range of sealing temperature is at least 30° C.

The heat sealable flexible film structure forms a hard seal when at least two of the following three parameters are met (preferably all three): (i) a sealing pressure of greater than or equal 1.0 N/mm$^2$; (ii) a dwell time of greater than or equal to 0.25 seconds; and (iii) a sealing temperature greater than or equal to 120° C.

In an embodiment, the frangible seal is formed when at least two of the following three parameters are met: (i) a sealing pressure less than 1.0 N/mm$^2$, (ii) a dwell time less than 0.25 seconds, and a sealing temperature less than 120° C.

In this way, the heat sealable flexible film structure advantageously enables production of either a frangible seal or a hard seal depending on the processing conditions.

In an embodiment, layers (A), (B), and layer (D) are formed by way of coextrusion. Outermost layer (C) is subsequently laminated to the coextruded structure A/B/(optional D). This forms heat sealable flexible film structure A/B/D/C with coextruded layer structure A/B/D and laminate outermost layer (C).

In an embodiment, layers (A), (B), (D), and outermost layer (C) are formed by way of coextrusion. This forms heat sealable flexible film structure with coextruded layer structure A/B/D/C.

In an embodiment, layers (A), (B), and layer (D) are formed by way of coextrusion. Outermost layer (C) is coated onto layer (D). This forms heat sealable flexible film structure A/B/D/C with coextruded layer structure A/B/D and a coating of outermost layer (C). In an embodiment, the heat sealable flexible film structure includes:

Layer (A) that is a seal layer (A) comprising from 70 wt % to 80 wt % propylene/ethylene copolymer and from 30 wt % to 20 wt % low density polyethylene;

Layer (B) that is a base layer (B) comprising an ethylene-based polymer selected from a high density polyethylene and a linear low density polyethylene;

Layer (D) that is an inner layer (D) comprising an ethylene-based polymer selected from a high density polyethylene and a linear low density polyethylene; and Layer (C) that is an outermost layer (C) composed of a poly(ethylene terephthalate) film.

In an embodiment, each heat sealable flexible film structure has the following configuration:

a seal layer (A) with a thickness from 5 microns, or 10 microns, or less than 15 microns, to 20 microns, or 25 microns, or than 30 microns;

a base layer (B) with a thickness from 10 microns to 100 microns;

an inner layer (D) with a thickness from 10 microns to 100 microns; and an outermost layer (C) with a thickness from 5 microns to 40 microns. In a further embodiment, the total thickness for the heat sealable flexible film structure is from 60 microns to 80 microns, or 70 microns.

In an embodiment, the heat sealable flexible film structure is processed via a cast extrusion process or a blown film extrusion process.

In an embodiment, the heat sealable flexible film structure includes one or more layers A, B, C, or D that are foamed.

In an embodiment, a flexible container is provided, the flexible container comprising the heat sealable flexible film structure.

The present heat sealable flexible film structure may comprise two or more embodiments disclosed herein.

5. Flexible container

The present disclosure also provides a flexible container. In an embodiment, the flexible container includes a first film and a second film. Alternatively, the flexible container can be formed from a single sheet that is folded, the fold defining the first film and the second film. Each of the first film and the second film includes the heat sealable flexible film structure as disclosed above. In particular the first film and the second film each include:

A seal layer (A) comprising a blend comprising from 35 to 80 percent by weight of the layer (A) of a propylene based plastomer or elastomer ("PBPE") and from 20 to 65 percent by weight of the layer (A) of a low density polyethylene having a density in the range of from 0.915 g/cm³ to 0.935 g/cm³, wherein the blend has a melt index (as determined according to ASTM D-1238 (at 190° C./2.16 Kg)

a base layer (B), adjacent to layer (A), comprising a polyolefin-based polymer, wherein the polymer or polymer blend which makes up layer (B) has a melt index (as determined according to ASTM D-1238 (at 190° C./2.16 Kg) which is equal to or higher than the melt index of the blend which makes up layer (A); and an outermost layer (C) comprising a material having a melting point greater than 140° C.; wherein the ratio of the thickness of layer (B) to the thickness of layer (A) is 3:1 or greater.

The films are arranged such that the second film is superimposed on the first film to form a common peripheral edge and the seal layer (A) of each film is in contact with each other. The flexible container includes a heat seal along at least a portion of the common peripheral edge. The flexible container may be a pouch, a sachet, a stand-up pouch, and a form-fill-and seal pouch.

In an embodiment, the seal layer (A) of the flexible container includes from 35 to 80 wt % of the "PBPE" and from 20 to 65 wt % of a low density polyethylene having a density in the range of from 0.915 g/cm³ to 0.935 g/cm³. Weight percent is based on total weight of layer (A). In an embodiment, the base layer (B) includes at least 75 wt % of a polyolefin based polymer as described above, preferably 100%. Weight percent is based on total weight of polymer in layer (B).

In an embodiment, the flexible container includes a hard seal and a frangible seal. In a further embodiment, the hard seal is located along at least one peripheral edge and the frangible seal is located in an area other than along the peripheral edge.

The conditions under which the seal is formed will in-part determine whether the seal is a frangible seal or a hard or lockup seal. In general, it is believed that lock up seals are produced under conditions (such as higher temperatures, higher pressures, and/or longer dwell times) which allow the adjacent layer (layer (B)) to be squeezed out to interfere with the seal between the seal layers (layer (A)). Without intending to be bound by theory, it is believed that when the adjacent layer is squeezed out, the edges of the seal become blunted, which does not allow failure to be initiated in layer (A) which is comprised of the easy peel material used for frangible seals.

In an embodiment, the entire peripheral edge of the flexible container is a hard seal. The flexible container also includes a frangible seal located in an area other than the peripheral edge. In an embodiment, the flexible container is made from a single sheet. The first film and the second film each is a component of the same single flexible sheet. The single flexible sheet is folded to superimpose the second film onto the first film, mating the seal layers (A) and forming a common peripheral edge as discussed above. The single sheet flexible container may be produced by way of a form, fill, and seal process.

The peripheral heat seal of the flexible container defines a container interior. In an embodiment, the flexible container further includes a frangible seal that traverses the container interior. The frangible seal defines two compartments. In an embodiment, the flexible container includes two or more frangible seals that traverse the container interior to define three or more compartments.

In an embodiment as shown in FIG. 1, a flexible container 10 is shown. The flexible container 10 is formed with the first film and the second film as described above. The flexible container 10 includes a peripheral heat seal 12.

For example, the peripheral heat seal 12 may form a hard seal formed when at least two of the following three (preferably all three) of the following heat seal conditions are met: (i) a sealing pressure greater than or equal to 1.0 N/mm², (ii) a dwell time greater than or equal to 0.25 seconds, and (iii) a sealing temperature greater than or equal to 120° C.

Figure 2:
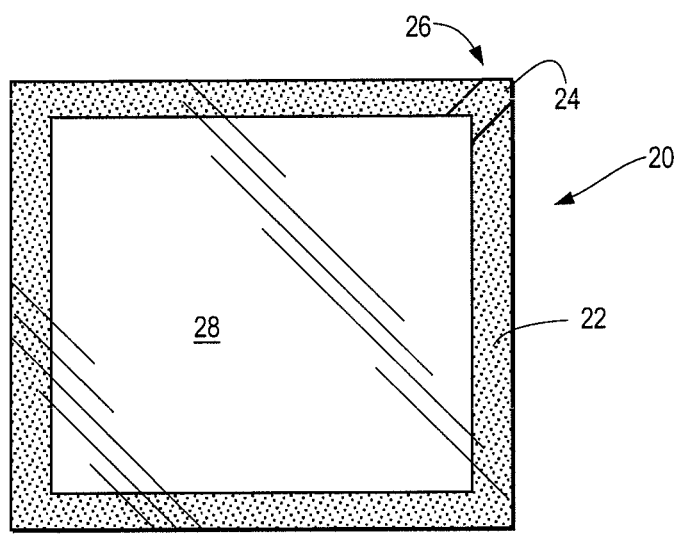
FIG. 2 is an elevation view of a flexible container in accordance with an embodiment of the present disclosure.

In an embodiment and as shown in FIG. 2, a flexible container 20 is shown. The flexible container 20 is formed from the first film and the second film as disclosed above. The flexible container 20 includes a peripheral hard seal portion 22 and a peripheral frangible seal portion 24. The peripheral frangible seal portion 24 is formed when at least two of the following heat seal conditions are met: (i) a sealing pressure less than 3.0 N/mm², (ii) a dwell time less than 1.5 seconds, and (iii) a sealing temperature less than 120° C. and combinations thereof.

In an embodiment, the flexible container 20 has two or more peripheral frangible seals on respective two or more sides of the container.

In an embodiment, the flexible container 20 has a rectangular shape. The frangible seal portion 24 is located at a corner 26 of the flexible container 20. The frangible seal portion 24 can be separated with hand pressure or with finger pressure while the peripheral hard seal portion 22 remains intact. In this way, the contents of the flexible container 20 can be removed from the container interior 28 by way of egress through separated (or opened) frangible seal portion 24. The size and position of the frangible seal portion 24 can be located at one or more locations along the peripheral heat seal 12.

In an embodiment, the frangible seal portion 24 can be shaped or otherwise formed into a nozzle.

In an embodiment, the flexible container 20 may include a secondary frangible seal proximate to the frangible seal portion 24 to prevent the frangible seal portion from opening during transportation and handling.

Figure 3:
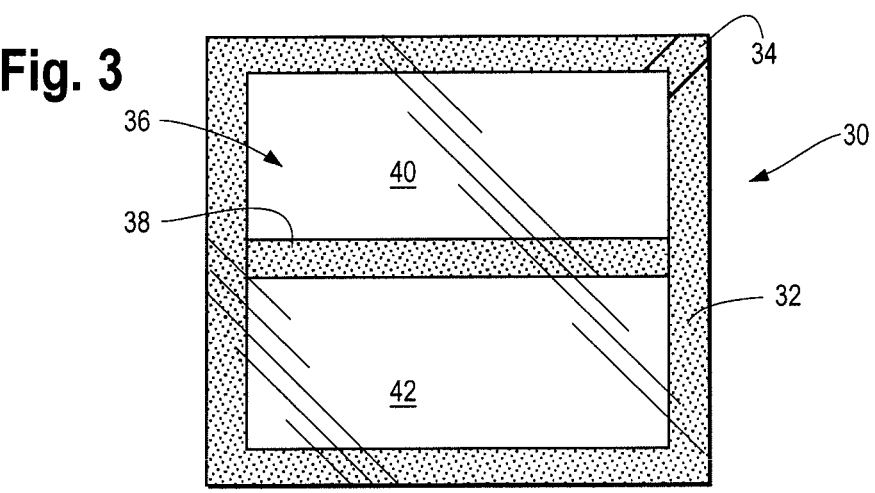
FIG. 3 is an elevation view of a flexible container in accordance with an embodiment of the present disclosure.

In an embodiment, a flexible container 30 is provided as shown in FIG. 3. The flexible container 30 includes a peripheral heat seal 32 that is a hard seal and may optionally include a peripheral frangible seal portion 34. The peripheral heat seal 32 as a hard seal is formed when at least two (preferably all three) heat seal conditions are met: (i) a sealing pressure greater than or equal to 1.0 N/mm$^2$ (ii) for a dwell time greater than or equal to 0.25 seconds, and (iii) a sealing temperature greater than 120° C. The peripheral heat seal 32 defines a container interior 36. A frangible seal 38 extends across the container interior 36. The shape and size of container interior 36 may be varied based on the type of content and package design.

The frangible seal 38 is formed when at least two (preferably all three) heat seal conditions are met: (i) sealing pressure less than 3.0 N/mm$^2$, (ii) a dwell time less than 1.5 seconds, and (iii) a sealing temperature less than 120° C. FIG. 3 shows the frangible seal 38 extending from one side of the peripheral heat seal 32 to an opposing side of the peripheral heat seal 32 thereby traversing the container interior and defining a first compartment 40 and a second compartment 42. The frangible seal 38 may formed into different shapes and configurations. The flexible container 30 may include one or more optional additional frangible seals, each similar to frangible seal 38 to define additional compartments.

The compartments 40, 42 are sealed to store respective contents in isolation or otherwise separated from the other compartment. When ready for use, a user separates or otherwise peels open the frangible seal 38 to combine or otherwise mix the content of compartment 40 with the content of compartment 42. The mixture may then be removed from the container 30 interior by rupturing peripheral frangible seal 34.

In an embodiment, the flexible container is in the form of one or more of the following: a pouch, a sachet, and a stand up pouch, and the peripheral heat seal is a combination of a hard seal and a frangible seal.

In an embodiment, the flexible container is in the form of a pouch, a sachet, a stand up pouch and the peripheral heat seal defines the container interior. The flexible container further includes a frangible seal internal to the peripheral heat seal and defining a first compartment and a second or more compartments.

Nonlimiting examples of contents suitable for containment by flexible containers 10, 20, 30 include comestibles (beverages, soups, cheeses, cereals), liquids, shampoos, oils, waxes, emollients, lotions, moisturizers, medicaments, pastes, surfactants, gels, adhesives, suspensions, solutions, enzymes, soaps, cosmetics, liniments, flowable particulates such as powders and granular products, and combinations thereof.

The present flexible container may comprise two or more embodiments disclosed herein.

Definitions

Unless stated to the contrary, implicit from the context, or customary in the art, all parts and percents are based on weight, and all test methods are current as of the filing date of this disclosure.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises, in polymerized form, a majority amount of ethylene monomer (based on the weight of the polymer), and optionally may comprise one or more comonomers.

The term "propylene-based polymer," as used herein refers to a polymer that comprises, in polymerized form, a majority amount of propylene monomer (based on weight of the polymer), and optionally may comprise one or more comonomers.

The term "propylene/ethylene copolymer," as used herein, refers to a polymer that comprises, in polymerized form, a majority amount of propylene monomer (based on the weight of the polymer), and a minority amount of ethylene comonomer and optionally may comprise one or more additional comonomers.

Test Methods

Density is measured in accordance with ASTM D792.

Differential Scanning Calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=(H$_f$/292 J/g)×100 (for PE)).

Unless otherwise stated, melting point(s) (T$_m$) of each polymer is determined from the second heat curve (peak Tm), and the crystallization temperature (T$_c$) is determined from the first cooling curve (peak Tc).

Melt flow rate, or MFR is measured in accordance with ASTM D 1238, Condition 230° C./2.16 kg.

Melt index, or MI, is measured in accordance with ASTM D 1238, Condition 190° C./2.16 kg.

Heat Seal Strength

Heat seal strength is a measure of the force required to separate a heat seal. Heat seal measurements on the film are performed on a commercial tensile testing machine according to ASTM F-88 (Technique A). The force required to separate a test strip of material identifies the mode of specimen failure. Heat seal strength is relevant to the opening force and package integrity.

Prior to cutting, the first film and the second film are conditioned for a minimum of 40 hours at 23° C. (±2° C.) and 50% (±5%) R.H. (Relative Humidity) in accordance with ASTM D-618 (procedure A). The films are then cut from the three-layer coextruded laminated film in the machine direction to a length of approximately 11 inches and a width of approximately 8.5 inches. The first film is heat sealed to the second film across the machine direction on a J&B Hot Tack Tester over a range of temperatures under the following conditions:

Sealing Pressure (unless otherwise indicated): 0.275 N/mm$^2$

Sealing Dwell Time: 0.5 seconds

The temperature range is approximately given by the Hot Tack Range (i.e. the temperature range over which at least a minimum hot tack seal is achieved and prior to the burn-through temperature).

The sealed films are conditioned for a minimum of 3 hours at 23° (±2° C.) and 50% R.H (±5%) prior to cutting into one inch wide strips. These strips are then further conditioned for a minimum of 21 hours at 23° (±2° C.) and 50% R.H (±5%) prior to testing. For testing, the strips are loaded into the grips of a tensile testing machine at an initial separation of 2 inches (50.8 mm) and pulled at a grip separation rate of 10 inches/min at 23° (±2° C.) and 50% R.H (±5%). The strips are tested unsupported. Six replicate tests are performed for each sealing temperature. The data reported is peak load, strain at peak load and failure mode.

Some embodiments of the present disclosure will now be described in detail in the following Examples.

Examples

A series of films are prepared using the resins identified in Table 1. The films each have three layers, Layer A, Layer B and Layer C, at varying thicknesses as reported in Table 2. The films are prepared as follows: Initially, a 5 layer blown film line is used to make coextruded films comprising layers A and B. The films are made using a 2.95 inch die, a blow up ratio of 2.5 and a 12 inch layflat. The films all have a 50 micron total thickness (except for Example 7 which has a 70 micron total thickness for the coextruded film comprising layers A and B) but the pump rates and screw speeds are varied to achieve the layer compositions as reported in Table 2. These films are then slit and separated. A 12 micron PET film (outermost layer C) is laminated to layer B of the coextruded structure using 2 to 3 g/m$^2$ of an adhesive layer composed of polyurethane (MOR-FREE™ MF 970/Cr-137). The laminations are oven-cured to completely cure the adhesive and form the heat sealable flexible film structures with layer configuration A/B/C. Each film has a total thickness of 82 microns. Once the outermost PET film is laminated to the coextruded structures the final heat sealable flexible film structures are formed. Outermost layer (C) enables higher sealing temperature (120° C. to 170° C.) to be applied to the structures without burning or sticking to the heat seal device.

The films thus prepared are then tested for heat seal strength. Heat seal measurements on the film are performed on a commercial tensile testing machine according to ASTM F-88 (Technique A). The heat seal test is a gauge of the strength of seals (seal strength) in flexible materials. It does this by measuring the force required to separate a test strip of material containing the seal and identifies the mode of specimen failure. Seal strength is relevant to the opening force and package integrity. Prior to cutting, the films are conditioned for a minimum of 40 hrs at 23° C. (±2° C.) and 50% (±5%) R.H. per ASTM D-618 (Procedure A). The sheets are heat sealed across the machine direction on a Kopp Heat Sealer, equipped with flat jaws of 167 mm×5 mm. A range of temperatures are used, with a sealing dwell time of 0.5 s. For sealing pressures of below 1 N/mm$^2$, sheets are cut from the film in the machine direction to a length of approximately 711 mm and a width of approximately 215.5 mm. For sealing pressures above 1 N/mm$^2$, lower width sheets are must be cut from the film to increase the force/area. In this study, films were sealed at either 0.275 or 1.5 N/mm$^2$. To achieve a sealing pressure of 1.5 N/mm$^2$ the films are cut to half the seal jaw width, about 83.5 mm wide, and sealed at a setting of 0.750 N/mm$^2$. Films without lamination are typically sealed with two 1-mil PET buffer films to prevent fouling of the sealing jaws due to melted polymer. However, as the films in this study were already laminated with PET, no additional PET was used for the low pressure sealing. However, the high pressure seals still required using these PET buffer films to safely seal the lower width films.

Films in this study are sealed at 20° C. increments from 80 to 180° C. The sealed sheets are conditioned for a minimum of 3 hours at 23° (±2° C.) and 50% R.H (±5%) prior to cutting into six 25.4 mm wide strips. These strips are then further conditioned for a minimum of 24 hours at 23° (±2° C.) and 50% R.H (±5%) prior to testing. For testing, the strips are loaded into the grips of a tensile testing machine at an initial separation of 50.8 mm and pulled at a grip separation rate of 254 mm/min at 23° (±2° C.) and 50% R.H (±5%). The strips are tested unsupported. Four replicate tests were performed for each sealing temperature. The peak load of each sample, whether it is the yield or the fracture point, is recorded by the lab for comparison of peel strength between different samples, which could be either the yield or the fracture point.

Figure 4:
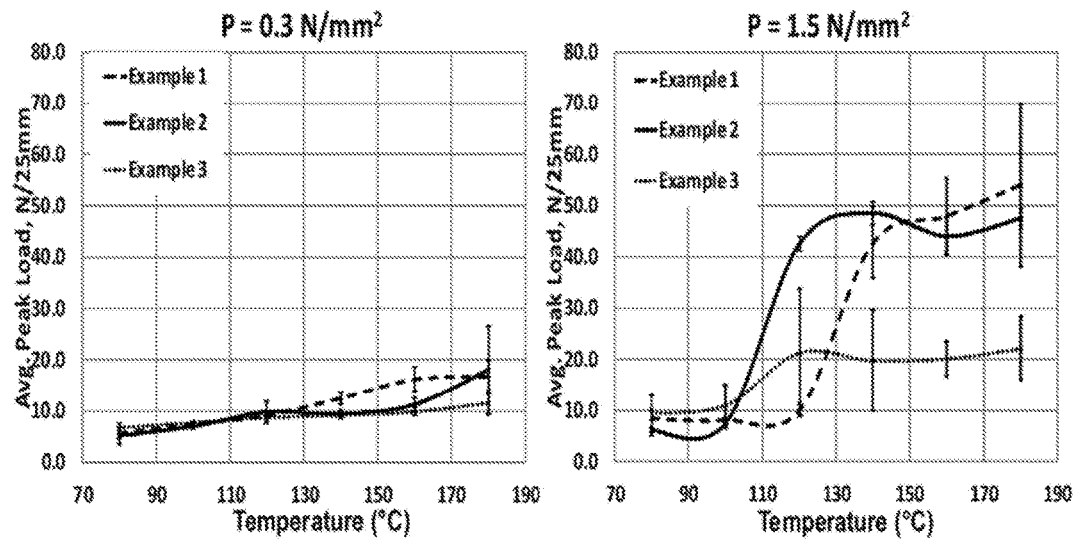
FIG. 4 shows heat seal curves for heat sealable flexible film structures in accordance with embodiments of the present disclosure.

FIG. 4 shows the heat seal behavior of several sealant laminate structures. Resin A is a blend comprised of 75 percent by weight propylene based plastomer or elastomer ("PBPE") and 25 percent by weight low density polyethylene (LDPE), having a blend density of 0.895 g/cm3, and a blend melt index of 3.8 g/10 min. Example 1 (dashed curve), a laminated 4:1 ratio Resin B (density=0.959 g/cm3, MI=5.0 g/10 min):Resin A structure is one particularly good example of the concept of a flexible film capable of forming easy peel and lock-up heat seals. At low temperatures, below the melting temperature of Resin B, with either low or high pressure, the structure delivers consistent low easy peel seal strength, <10 N/25 mm. At high temperature above the melting of the adjacent layer Resin B, and pressure>1.0 MPa, the structure delivers consistent higher seal strength, ~50 N/25 mm for a lockup seal.

The temperature window for easy peel and lockup seals can be controlled by adjusting the melting temperature of Layer B. Example 2, the solid curve, representing a laminated 4:1 ratio Resin C (density=0.921 g/cm3, MI=5.4 g/10 min):Resin A structure performs similarly to the Resin B-backed structure, with a smaller low temperature window as Resin C melts at a lower temperature than Resin B.

Structures with backing resins with MI lower than the sealant did not achieve lockup strengths as high as those with equal to or higher MI than the sealant. Structures with >35% low adhesion sealant are also unable to deliver the same high peel strengths. One such example (Example 3) of both conditions is shown as the dotted curves in FIG. 4, a laminated 3:2 ratio Resin D (density=0.920 g/cm3, MI=1.0 g/10 min):Resin A structure. This structure delivered inconsistent peel strengths above the melting point of Resin D, many times lower in strength than the other structures, ~20 N/25 mm.

Figure 5:
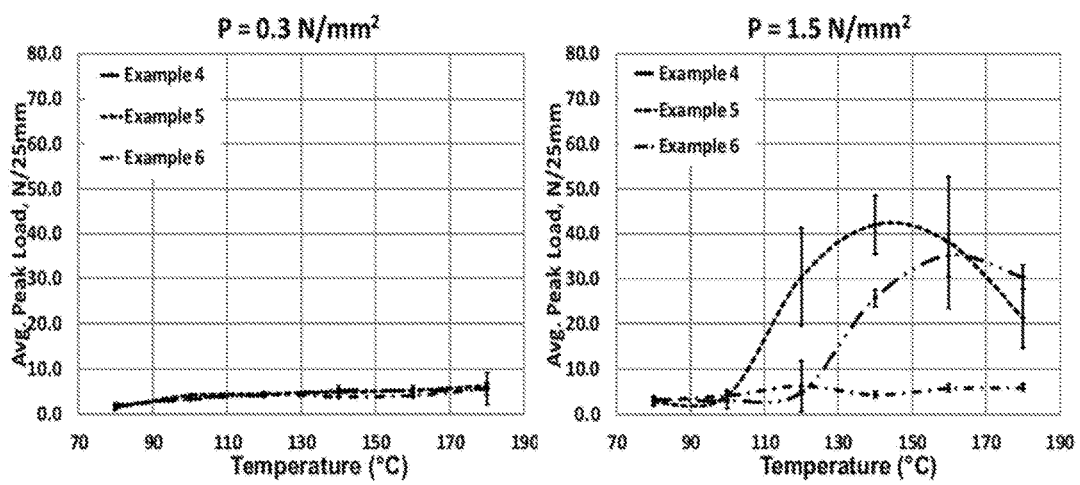
FIG. 5 shows heat seal curves for heat sealable flexible film structures in accordance with embodiments of the present disclosure.

Another set of flexible films capable of achieving both easy peel and lockup seals using Resin E sealant structures is portrayed in FIG. 5. Resin E is a blend comprised of 50 percent by weight propylene based plastomer or elastomer ("PBPE") and 50 percent by weight low density polyethylene (LDPE), having a blend density of 0.902 g/cm$^3$, and a blend melt index of 1.2 g/10 min. Example 4 (dash-dot-dot curve), representing a laminated 4:1 ratio Resin F (density=0.962 g/cm$^3$, MI=0.85 g/10 min)/Resin E structure, again shows that at low temperatures, below the melting temperature of the backing, with either low or high pressure, the structure delivers consistent low easy peel seal strength, <10 N/25 mm. At high temperature above the melting of the adjacent layer, and pressure>1.0 MPa, the structure delivers consistent higher seal strength, ~35.0 N/25 mm for a lockup seal. The elevated pressure increases the shear rate applied to the system, and allows for the needed enveloping action of the adjacent layer around the sealant layer at higher temperatures, despite the slightly lower reported MI value (190° C., 2.16 kg load).

The temperature window for easy peel and lockup seals could also be controlled with the melting temperature of the backing layer (Layer B). Example 5, the square dot curve, representing a laminated 4:1 ratio Resin C (density=0.921 g/cm$^3$, MI=5.4 g/10 min)/Resin E structure performs similarly to the Resin F-backed structure, with a smaller low temperature window as Resin F melts at a lower temperature than Resin E.

Structures with backing resins with MI lower than the sealant did not achieve lockup strengths as high as those with equal to or higher MI than the sealant. Structures with >35% low adhesion sealant are also unable to deliver the same high peel strengths. One such example (Example 6) of both conditions is shown as the dash-dot curves in FIG. 5, a laminated 3:2 ratio Resin D (density=0.920 g/cm3, MI=1.0 g/10 min):Resin E structure. This structure delivered inconsistent peel strengths above the melting point of Resin D, many times lower in strength than the other structures, ~5 N/25 mm.

Example 7 demonstrates that polypropylene (Resin J) is also a suitable material for Layer B, and can achieve adequate lockup strengths at higher pressures.

TABLE 1

Polyolefin resins.

| Resin | Type | I2 (g/10 min) | Density (g/cm$^3$) |
|---|---|---|---|
| Resin A | 75% Resin G + 25% Resin I | 3.8 | 0.895 |
| Resin B | Low viscosity/high MI HDPE | 5.0 | 0.959 |
| Resin C | Low viscosity/high MI LLDPE | 5.4 | 0.921 |
| Resin D | High viscosity/low MI LLDPE | 1.0 | 0.920 |
| Resin E | 50% Resin H2 + 50% Resin I | 1.2 | 0.902 |
| Resin F | High viscosity/low MI HDPE | 0.85 | 0.962 |
| Resin G | Propylene-ethylene copolymer, 8 MFR, 9% PE | 8.0 MFR (230° C./2.16 kg) | 0.876 |
| Resin H | Propylene-ethylene copolymer, 2 MFR, 9% PE | 2.0 MFR (230° C./2.16 kg) | 0.876 |
| Resin I | LDPE | 2.0 | 0.920 |
| Resin J | Random polypropylene copolymer | 2.0 MFR (230° C./2.16 kg) | 0.900 |

*.

The coextruded structures are shown in Table 2 below.

TABLE 2

Coextruded structures

| Example # | Coextruded Structures | | | Thickness (microns) | |
|---|---|---|---|---|---|
| | Outermost Layer (C) | Adjacent Layer (B) | Seal layer (A) | Adjacent Layer (B) | Seal layer (A) |
| 1 | PET laminate | 80% Resin B | 20% Resin A | 40 | 10 |
| 2 | PET laminate | 80% Resin C | 20% Resin A | 40 | 10 |
| 3 (comparative) | PET laminate | 60% Resin D | 40% Resin A | 30 | 20 |
| 4 | PET laminate | 80% Resin F | 20% Resin E | 40 | 10 |
| 5 | PET laminate | 80% Resin C | 20% Resin E | 40 | 10 |
| 6 (comparative) | PET laminate | 60% Resin D | 40% Resin E | 30 | 20 |
| 7 | PET laminate | 80% Resin J | 20% Resin E | 55 | 15 |

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:
1. A heat sealable flexible film structure comprising:
a layer (A) comprising a blend comprising from 35 to 80 percent by weight of the layer (A) of a propylene based plastomer or elastomer ("PBPE") and from 20 to 65 percent by weight of the layer (A) of a low density polyethylene having a density in the range of from 0.915 g/cm$^3$ to 0.935 g/cm$^3$, wherein the blend has a melt index (as determined according to ASTM D-1238 (at 190° C./2.16 Kg) and wherein the PBPE has a molecular weight distribution (MWD) of 3.5 or less;
a layer (B), adjacent to layer (A), comprising a polyolefin-based polymer, wherein the polymer or polymer blend which makes up layer (B) has a melt index (as determined according to ASTM D-1238 at 190° C./2.16 kg) which is equal to or higher than the melt index of the blend of layer (A), and wherein the polyolefin-based polymer comprises a high density polyethylene having a density from 0.940 g/cc to 0.965 g/cc and a melt index less than 5.0 g/10 min; and an outermost layer (C) comprising a material having a melting point greater than 140° C.; wherein the ratio of the thickness of layer (B) to the thickness of layer (A) is 3:1 or greater, wherein the layer (B) comprises a high density polyethylene having a density from 0.940 g/cc to 0.965 g/cc and a melt index less than 5.0 g/10 min.

2. The film structure of claim 1 wherein layer (B) further comprises a resin selected from the group consisting of (i) a Ziegler-Natta catalyzed ethylene copolymer comprising units derived from ethylene and one or more α-olefins having from 3 to 10 carbon atoms; (ii) a metallocene catalyzed ethylene copolymer comprising units derived from ethylene and one or more α-olefins having from 3 to 10 carbon atoms; (iii) a Ziegler-Natta catalyzed ethylene homopolymer; (iv) a metallocene catalyzed ethylene homopolymer, (v) homopolymer polypropylene (vi) random copolymer polypropylene, and combinations thereof.

3. The film structure of claim 1 wherein the polymer or polymer blend which makes up layer (B) has a viscosity lower than or equal to the viscosity of the blend which makes up layer (A) wherein the viscosity is determined at a temperature greater than or equal to 120° C.

4. The film structure of claim 1 wherein the polymer or polymer blend which makes up layer (B) has a density in the range of from 0.92 to 0.96 g/cm$^3$.

5. The film structure of claim 4 wherein the polymer or polymer blend which makes up layer (B) has a density in the range of from 0.93 to 0.96 g/cm$^3$.

6. The film structure of claim 1 wherein the ratio of the thickness of layer (B) to the thickness of layer (A) is from 4:1 up to 4.5:1.

7. The film structure of claim 1, wherein the film structure forms (i) a hard seal when two (A) layers are brought into contact with each other and exposed to a first set of sealing conditions and (ii) a frangible seal when two (A) layers are brought into contact with each other and exposed to a second set of sealing conditions.

8. The film structure of claim 7 wherein the first set of sealing conditions includes applying a pressure of less than 0.5 MPa and the second set of sealing conditions includes applying a pressure greater than 0.5 MPa.

9. The film structure of claim 7 wherein the first set of sealing conditions includes applying a temperature which is at least 30° C. higher than the temperature applied during the second set of sealing conditions.

10. The film structure of claim 7 wherein the first set of sealing conditions includes applying a temperature which is at least 30° C. higher than the temperature applied during the second set of sealing conditions and wherein the first set of sealing conditions includes applying a pressure of less than 0.5 MPa and the second set of sealing conditions includes applying a pressure greater than 0.5 MPa.

11. The heat sealable flexible film structure of claim 1 wherein the seal layer (A) has a thickness less than 30 microns.

12. The heat sealable flexible film structure of claim 1 wherein the layer (A) comprises from 50 wt % to 80 wt % propylene/ethylene copolymer and from 50 wt % to 20 wt % low density polyethylene.

13. The heat sealable flexible film structure of claim 1 wherein the outermost layer (C) is a material selected from the group consisting of poly(ethylene terephthalate) (PET), polyamide, propylene homopolymer, and combinations thereof.

14. The heat sealable flexible film structure of claim 1 further comprising an inner layer (D) disposed between layer (B) and the outermost layer (C).

15. The heat sealable flexible film structure of claim 14 wherein the inner layer (D) comprises a polymer selected from the group consisting of a high density polyethylene, a linear low density polyethylene, a low density polyethylene, ethylene vinyl alcohol copolymer, maleic anhydride-modified polyethylene, polyamide, cyclic olefin copolymer, ethylene vinyl acetate, propylene homopolymer, vinylidene chloride polymer, and combinations thereof.

16. The heat sealable flexible film structure of claim 14 wherein the inner layer (D) comprises a high density polyethylene having a density from 0.940 g/cc to 0.965 g/cc and a melt index less than 5.0 g/10 min.

17. The heat sealable flexible film structure of claim 1 wherein one or more of the layers is foamed.

18. A flexible container comprising the heat sealable flexible film structure of claim 1.

* * * * *